United States Patent [19]
Voss et al.

[11] 3,896,379

[45] July 22, 1975

[54] INTERCOM CIRCUIT FOR A RADIO TRANSMITTER AND RECEIVER

[75] Inventors: Robert A. Voss, Lynchburg; Larry H. Wohlford, Rustburg, both of Va.

[73] Assignee: General Electric Company, N.Y.

[22] Filed: June 10, 1974

[21] Appl. No.: 477,968

[52] U.S. Cl. .................... 325/21; 179/2 E

[51] Int. Cl. .................... H04b 1/44

[58] Field of Search .......... 325/21, 22, 15; 179/1 H, 179/1 VC, 1 B, 1 MN, 2 E, 2.5 R, 2.5 B, 37; 340/291; 343/175, 177

[56] References Cited

UNITED STATES PATENTS

| | | | |
|---|---|---|---|
| 2,496,398 | 2/1950 | Lambert | 179/2 E |
| 2,559,898 | 7/1951 | Plawczyk | 179/2 E |
| 3,849,603 | 11/1974 | Prois | 179/1 H |

*Primary Examiner*—Robert L. Griffin
*Assistant Examiner*—Robert Hearn

[57] ABSTRACT

An intercom circuit is provided for a radio transmitter and receiver at a station location connected by a transmission line to a remote location. The intercom circuit uses the audio amplifier of the receiver and includes switches which normally connect the transmission line to the receiver audio amplifier for monitoring the transmission line at the station location. The switches disconnect the transmission line from the receiver audio amplifier and connect the receiver demodulator to the receiver audio amplifier in response to signals detected by the receiver. The switches also disconnect both the transmission line and the receiver demodulator from the receiver audio amplifier in response to operation of the microphone at the station location.

2 Claims, 3 Drawing Figures

| CURCUIT FUNCTION | Q1 | Q2 (LINE AUDIO) | Q3 | Q4 | Q5 | Q6 (LOCAL AUDIO) | Q7 | Q8 (REC. AUDIO) | Q9 |
|---|---|---|---|---|---|---|---|---|---|
| (a) NO SIGNAL | OFF | ON | ON | OFF | ON | OFF | ON | OFF | ON |
| (b) RECIEVER SIGNAL | ON | OFF | OFF | OFF | ON | OFF | ON | ON | OFF |
| (C) TRANSMITTER OPERATED | OFF | ON | ON | OFF | ON | OFF | ON | OFF | ON |
| (d) OPERATE BUTTON 48 | OFF | OFF | OFF | OFF | ON | OFF | ON | ON | OFF |
| (e) PTT OPERATED | OFF | OFF | ON | ON | OFF | ON | OFF | OFF | ON |

FIG.3

INTERCOM CIRCUIT FOR A RADIO TRANSMITTER AND RECEIVER

BACKGROUND OF THE INVENTION

Our invention relates to an itercom circuit, and particularly to an intercom circuit that permits the audio amplifier of a radio receiver to be used to monitor signals on a transmission line connected from the receiver to a remote location and to monitor signals received by the receiver.

In many radio installations, a transmitter and receiver are provided at a station location and connected by a transmission line (usually a telephone line) to a remote location. An operator is usually always present at the remote location, but sometimes an operation may be present at the station location. When an operator is at the station location, it is desirable that he be able to hear signals on the transmission line from the remote location and to hear signals received by the receiver. As far as we are aware, this has been previously achieved only with an amplifier for the received signals and an amplifier for the transmission line signals.

Accordingly, a primary object of our invention is to provide a novel intercom circuit for use at a station location that permits signals on a transmission line extending to a remote location and signals received by a receiver at the station location to be simplified and reproduced by the audio amplifier of the receiver.

Another object of our invention is to provide a new and improved intercom circuit that switches the audio amplifier of a radio receiver from its normal connection to a transmission line to the demodulator output of the receiver in response to a received radio signal.

Another object of our invention is to provide a new and improved intercom circuit for a transmitter and receiver station that switches the audio amplifier of a radio receiver from its normal connection to a transmission line to the demodulator output of the radio receiver in response to a received radio signal, and that disconnects the audio amplifier from both the transmission line and the demodulator output in response to activation of the microphone for the transmitter of the station.

SUMMARY OF THE INVENTION

Briefly, these and other objects are achieved by intercom apparatus when used with a radio transmitter and microphone and a radio receiver and speaker at a station location connected by a transmission line to a remote location. The intercom apparatus in accordance with our invention comprises means adapted to be connected in series with the audio portion of the radio receiver between the receiver demodulator and the audio amplifier of the radio receiver. Means are also adapted to be connected to the transmission line for deriving audio signals therefrom. Switching means operated by a control circuit are provided so that in the absence of signals received by the radio receiver, the receiver is disconnected from its audio amplifier and the transmission line is connected to the amplifier so that audio signals on the transmission line will be heard through the receiver speaker. When the receiver receives and demodulates radio signals, the control circuit causes the switching means to disconnect the receiver amplifier from the transmission line and connect the receiver demodulator output to the amplifier so that the received signals will be heard over the receiver speaker. In addition, when the microphone at the station location is operated, the receiver audio amplifier is disconnected from both the transmission line and the receiver demodulator so that no signals will be produced by the receiver speaker.

BRIEF DESCRIPTION OF THE DRAWING

The subject matter which we regard as our invention is particularly pointed out and distinctly claimed in the claims. The structure and operation of our invention, together with further objects and advantages, may be better understood from the following description given in connection with the accompanying drawing, in which:

FIG. 3 shows a table illustrating the operation of our intercom circuit of FIG. 2.

DESCRIPTION OF THE PREFERRED EMBODIMENT BACKGROUND

Figure 1:
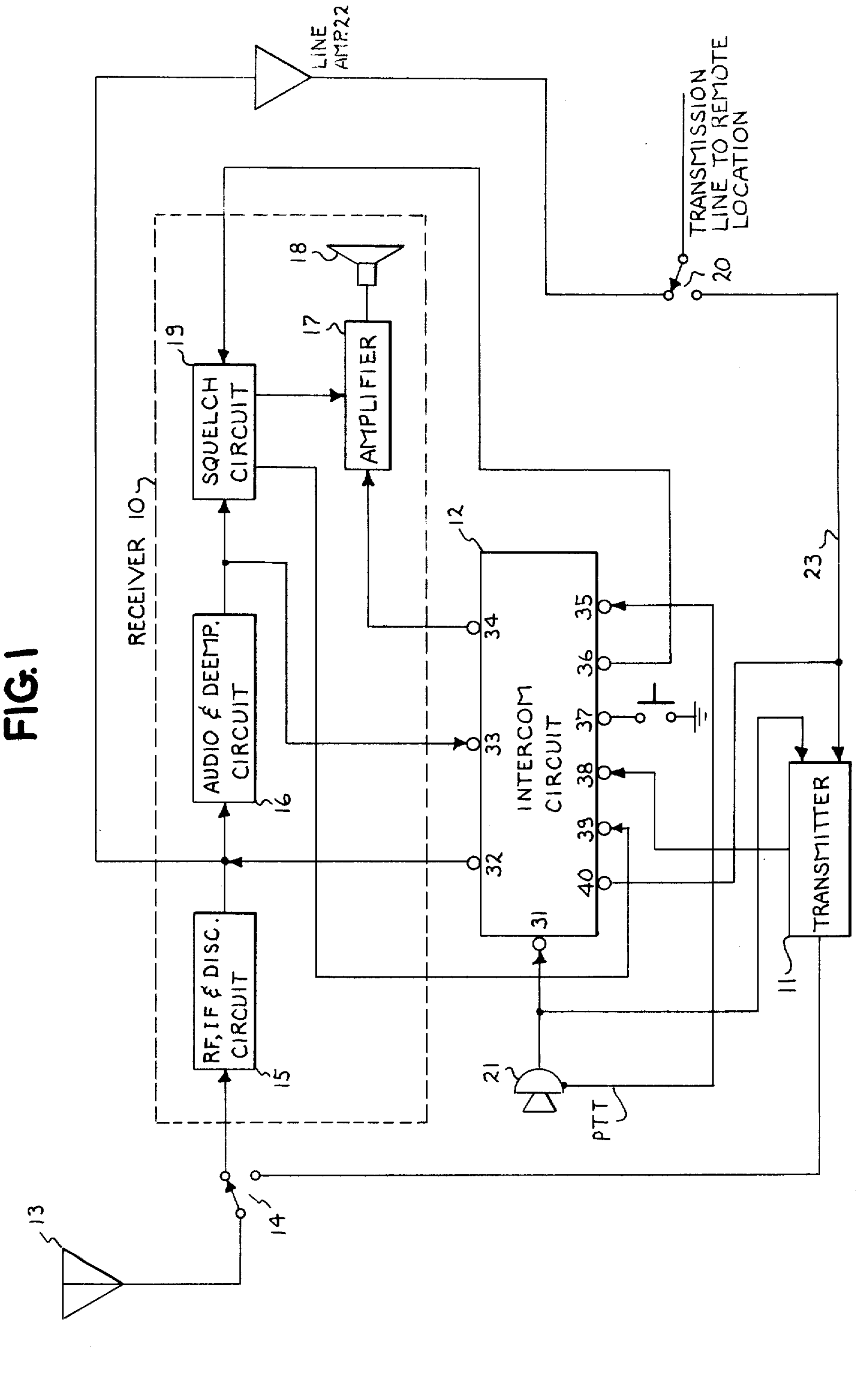
FIG. 1 shows a block diagram of a station location having a radio receiver and transmitter, and an intercom circuit in accordance with our invention.

FIG. 1 shows a block diagram of a typical station having a receiver 10 and a transmitter 11 provided with an intercom circuit 12 in accordance with our invention. While other types of radio equipment may be utilized, we contemplate that the receiver 10 and the transmitter 11 use frequency modulation and are in the mobile services. Such stations typically include a common antenna 13 connected to a switch 14 which is normally connected to the receiver 10. When so connected, signals from the antenna 13 are applied to an element 15 which comprises radio frequency amplifier stages, intermediate frequency amplifier stages, and a demodulator or discriminator circuit. The output from the discriminator circuit is applied to an audio and deemphasis circuit 16 for the purpose of compensating for pre-emphasis of received signals, audio amplification and high pass filtering to reduce audio frequencies below 300 Hz. The de-emphasized signals are normally applied to an audio amplifier 17 which amplifies the signals and supplies them to a loudspeaker 18. However, in accordance with our invention, we supply these audio signals to our intercom circuit 12 for switching purposes, after which the audio signals are supplied to the amplifier 17. This will be explained in more detail hereinafter. The audio and de-emphasized signals are also applied to a squelch circuit 19 which is connected to the amplifier 17. The purpose of the squelch circuit 19 is to block or render inoperative the amplifier 17 except when a carrier signal of selected magnitude with respect to noise is received.

The transmitter 11 may take any of the known forms, and its output is supplied to one of the contacts of the switch 14. The input of the transmitter 11 is connected to a switch 20 which, in turn, is connected by a transmission or telephone line to a remote location. A microphone 21 is provided at the station for use with the transmitter 11 and also for talking to the remote location in accordance with our invention. In order that the remote location can hear signals from the receiver 10, a connection is provided at the output of the discriminator circuit 15 and supplied to a line amplifier 22 which provides the desired characteristics for transmission over a transmission line, which typically is a telephone line requiring certain bandwidths and levels of signals. The switch 20 is normally in the position shown so that signals received by the antenna 13 are demodulated and supplied over the transmission line to the remote location. When the remote location wishes to transmit, appropriate signals are provided to cause the switches 14, 20 to change to their other position and connect the transmission line to a line 23 connected to the input of the transmitter 11, and to connect the transmitter 11 to the antenna 13.

Intercom Circuit — Description

Figure 2:
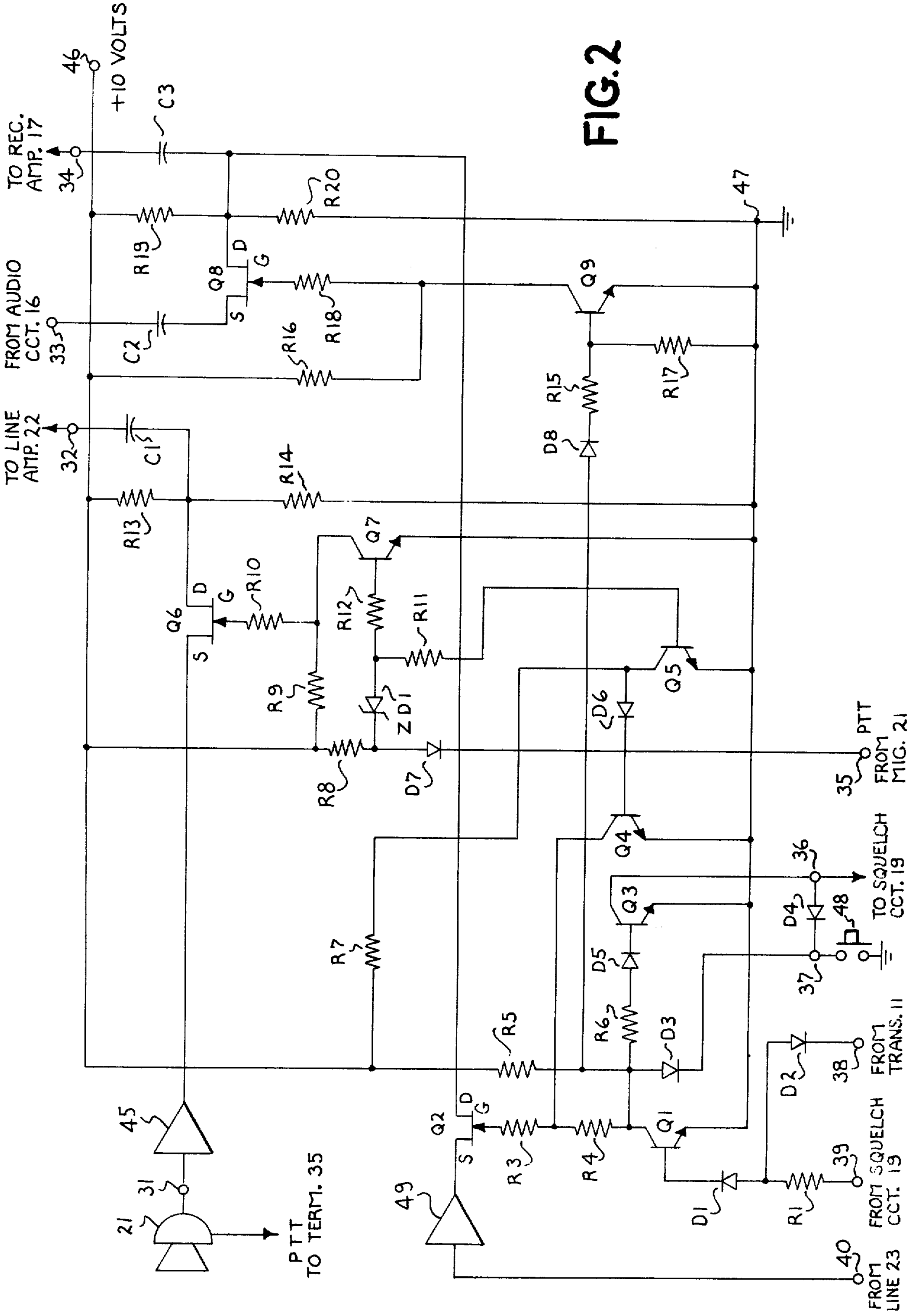
FIG. 2 shows a schematic diagram of a preferred embodiment of an intercom circuit in accordance with our invention.

The diagram of FIG. 1 described thus far is known in the art. As previously mentioned, it is desirable that an operator at the station location be able to hear signals coming over the transmission line from the remote location and also be able to hear signals received by the receiver 10. Previously, such an arrangement required an additional amplifier and sometimes an additional loudspeaker, so that one purpose of our intercom circuit 12 is to permit the amplifier 17 and the speaker 18 of the receiver 10 to provide both functions. FIG. 2 shows an electrical schematic diagram of a preferred embodiment of our intercom circuit 12. In FIG. 2, we have arranged the position of the terminals to and from other parts of the transmitter and receiver station in the same general location as the terminals around the block or rectangle in FIG. 1 representing the intercom circuit 12. Thus, starting at the left in both intercom circuits of FIGS. 1 and 2, we show an input terminal 31, and preceding in a clockwise direction around both circuits, we show similarly located terminals 32 through 40. Since FIG. 2 does not show the actual connections to other parts at the station, we have provided legends to show where the connections would be made.

Starting with the terminal 31, audio signals from the microphone 21 are applied to this terminal 31, are amplified by an amplifier 45, and applied to the source S of a junction field-effect transistor (hereinafter designated as J-FET) Q6 which acts as a switch. The drain D of the transistor Q6 is connected through a capacitor C1 to the terminal 32 which is connected to the line amplifier 22. When the voltage of the gate G of the transistor Q6 is positive with respect to the voltage of the drain D, a low impedance path is provided between the source S and drain D. When the voltage of the gate G is the same as or is negative with respect to the voltage of the drain D, a high impedance path is provided between the source S and drain D. The switched condition of the transistor Q6 is controlled by a transistor Q7. The microphone 21 is also provided with a push-to-talk (PTT) output. The push-to-talk output is produced whenever the microphone button is operated or depressed, and we assume that this output provides a ground connection. The terminal 33 is connected to the output of the audio and de-emphasis circuit 16, and audio signals from this circuit 16 are coupled through a capacitor C2 to the source S of a J-FET switching transistor Q8. The drain D of the transistor Q8 is coupled through a capacitor C3 to the terminal 34 which is connected to the input of the receiver amplifier 17. The switched condition of the transistor Q8 is controlled by a transistor Q9.

Suitable direct current for the intercom circuit 12 is provided at terminals 46, 47 which are respectively connected to positive and negative terminals of a source of direct current voltage, indicated as being 10 volts in this circuit. The terminal 47 may be grounded as shown.

The terminal 35 is connected to the push-to-talk output from the microphone 21 for switching the transistor Q7 through a diode rectifier D7, a zener diode ZD1, and a resistor R12 connected to the gate of the transistor Q7. The conduction of the transistor Q7 controls the switched condition of the J-FET transistor Q6 as will be explained. The terminal 37 is connected through a diode rectifier D4 to the terminal 36 which is connected to the squelch circuit 19. Operation of the squelch circuit is blocked or disabled whenever the terminal 36 is grounded. The terminal 36 can be grounded by the push-button switch 48 or by conduction of a transistor Q3. When the squelch circuit 19 is disabled, it permits the receiver amplifier 17 to amplify whatever signals are present at its input.

The terminal 40 is connected to the line 23 which, when the switch 20 is operated, receives signals from the remote location. Signals at the terminal 40 are amplified by an amplifier 49 and applied to the source S of a J-FET switching transistor Q2. The drain D of the transistor Q2 is connected to the capacitor C3 and applies signals to the terminal 34 and the receiver amplifier 17. Switching of the transistor Q2 is controlled by a transistor Q1 and signals from the squelch circuit 19 applied to the terminal 39. When signals are received in the receiver 10 and demodulated, a positive signal is produced and applied to the terminal 39 for controlling conduction of the transistor Q1, which in turn controls the transistor Q2 as will be explained. Signals from the transmitter 11, indicating operation of the transmitter 11, are applied to the terminal 38 for also controlling the transistor Q1 and switching transistor Q2. The switching transistor Q2 is also controlled by transistors Q4, Q5 and the push-to-talk signal at the terminal 35.

Intercom Circuit — Operation

The operation of our intercom circuit 12 of FIGS. 1 and 2 will be discussed in connection with the table of FIG. 3. In FIG. 3, the left vertical column indicates the circuit function taking place, and the nine columns to the right indicate the condition of the transistors Q1 through Q9 in FIG. 2 for the particular circuit function. In line (*a*), we have assumed that the circuit of FIG. 2 is receiving no signals and that no station functions are taking place. Under this condition, the control terminals 39, 38, 37, 35 are floating. This causes the transistor Q1 to be turned off, so that positive voltage is applied to the gate G of the transistor Q2 to turn the transistor Q2 on and connect audio signals from the line 23 through the amplifier 49, the source S and drain D of the transistor Q2, the capacitor C3, and the terminal 34 to the receiver amplifier 17. The turned off condition of the transistor Q1 causes the transistor Q3 to be turned on, so that the terminal 36 is at ground. This ground condition operates through the squelch circuit 19 to unblock the amplifier 17. Hence, any signals on the transmission line and the line 23 will be heard from the loudspeaker 18. However, audio signals from the receiver circuit 16 cannot pass through the transistor Q8, since the transistor Q8 is turned off. This results from the fact that the transistor Q9 is turned on by the off condition of the transistor Q1, pulling the gate G of the transistor Q8 toward ground. With no signal at the terminal 35, the transistor Q7 is turned on and this turns the transistor Q6 off. The same positive voltage that turns the transistor Q7 on also turns on the transistor Q5 which causes the transistor Q4 to be turned off.

In line (*b*) of FIG. 3, we have assumed that the receiver 10 receives a signal. The receiver squelch circuit 19 produces a positive going signal which is applied to the terminal 39 and causes the transistor Q1 to be turned on. This pulls the gate voltage of the transistor Q2 downward and turns the transistor Q2 off so that signals from the line 23 are blocked. The transistor Q3 is also turned off, so that the terminal 36 is floating. When the transistor Q1 is turned on, its collector voltage also turns the transistor Q9 off. This permits the gate voltage of the transistor Q8 to rise and turn the transistor Q8 on so that audio signals from the circuit 16 pass through the transistor Q8 to the receiver amplifier 17 and are heard in the loudspeaker 18. The transistors Q4 through Q7 remain in the same condition as before, the primary significance being that the transistor Q6 is turned off.

In line (*c*), we have assumed that the transmitter 11 is keyed or operated. When this occurs, the terminal 38 is grounded, and this turns the transistor Q1 off. This causes the transistor Q2 to pass signals from the line 23 to the receiver amplifier 17 so that a person at the station will hear the signals coming from the remote location and being sent to the transmitter 11. The transistor Q3 is also turned on to enable the amplifier circuit 17 through the squelch circuit 19. With the transistor Q1 off, the transistor Q9 is turned on so that the transistor Q8 prevents receiver signals from reaching the amplifier 17. The remainder of the circuit transistors Q4 through Q7 is the same as in lines (*a*) and (*b*).

In line (*d*), we have assumed that the operator at the station location wishes to hear whatever signals may be present and received by the receiver 10. To achieve this, he depresses the push-button 48 to provide a ground through the diode D4 to the terminal 36, and this enables the amplifier circuit 17 through the squelch circuit 19, so that signals can be heard. Grounding of the terminal 37 lowers the voltage of the gate G of the transistor Q2 to turn the transistor Q2 off so that line signals cannot reach the receiver amplifier 17. This same grounding passes through the diode D3 and turns the transistor Q9 off, so that the transistor Q8 is turned on and signals from the receiver audio circuit 16 pass through the transistor Q8 to the terminal 34 and the receiver amplifier 17. The remainder of the circuit transistors Q4 through Q7 remains as described in lines (*a*), (*b*), and (*c*).

Next, in line (*e*), we have assumed that the operator at the station wishes to operate the transmitter 11 and make a transmission through his microphone 21. When he operates his microphone, the push-to-talk PTT signal causes the terminal 35 to be grounded. This causes the transistor Q7 to be turned off, so that the voltage of the gate G of the transistor Q6 rises and turns the transistor Q6 on. Signals from the microphone are then passed through the amplifier 45, the transistor Q6, and the capacitor C1 to the terminal 32 and the line amplifier 22 which sends these signals over the transmission line to the remote location. Persons at the remote location will then hear the transmission at the station. Grounding of the terminal 35 also causes the transistor Q5 to be turned off, and this causes the transistor Q4 to be turned on. When the transistor Q4 is turned on, it reduces the voltage at the gate G of the transistor Q2 to turn the transistor Q2 off, so that signals on the line 23 cannot reach the receiver amplifier 17. The transistor Q3 is biased on since the transistor Q1 is off. This enables the amplifier circuit 17 through the squelch circuit 19. However, the transistor Q9 is turned on, and this turns the transistor Q8 off so that audio signals from the receiver circuit 16 cannot reach the receiver amplifier 17. Hence, the amplifier 17 and the loudspeaker 18 receive no signals during this time.

It will thus be seen that we have provided an intercom circuit which uses the already existing amplifier and loudspeaker of a radio receiver in a manner such that the single amplifier and speaker can reproduce signals on the transmission line from a remote point, or signals received by the receiver. In addition, our intercom circuit enables an operator to still make transmissions at the station location and also to monitor receiver channel conditions. Thus, our circuit provides an improved and more efficient utilization of existing equipment without any modification, other than making a connection in series with the receiver audio circuit. While we have shown only one embodiment of our invention, persons skilled in the art will appreciate that various modifications may be made. For example, various types of transistors, particularly the transistors Q2, Q6, Q8, can be provided for the switching. In addition, the feature of the push-button 48 to monitor channel conditions and the feature of the PTT signal are optional and may be selectively used or not used. Therefore, while our invention has been described with reference to a particular embodiment, it is to be understood that modifications may be made without departing from the spirit of the invention or from the scope of the claims.

What we claim as new and desire to secure by Letters Patent of the United States is:

1. Intercom apparatus for use with a radio transmitter and microphone and a radio receiver and speaker at a station location connected by a transmission line to a remote location, said intercom comprising:

a. means adapted to be connected in series with the audio portion of the radio receiver for deriving the audio signals from the demodulator of said radio receiver at a first terminal and for supplying audio signals to the amplifier of said radio receiver at a second terminal;
b. means adapted to be connected to the transmission line for deriving audio signals therefrom at a third terminal and for supplying audio signals thereto at a fourth terminal;
c. first switching means having an input connected to said first terminal, an output connected to said second terminal, and a control terminal;
d. second switching means having an input connected to said third terminal, an output connected to said second terminal, and a control terminal;
e. a control circuit having a plurality of inputs and having an output;
f. means connecting said control circuit output to said control terminals of said first and second switching means for causing said first switching means to disconnect its input and output and for causing said second switching means to connect its input and output in the absence of signals at said control circuit inputs;
g. means connected to one of said control circuit inputs and adapted to be connected to said radio receiver for sensing receipt of a signal by said radio receiver and for causing said first switching means to connect its input and output and for causing said second switching means to disconnect its input and output in response to receipt of a signal;

h. means connected to one of said control circuit inputs and adapted to be connected to the radio transmitter for sensing the activation of said radio transmitter, and for causing said first switching means to disconnect its input and output and for causing said second switching means to connect its input and output in response to an activation;

i. and means connected to one of said control circuit inputs and adapted to sense operation of the microphone at said station location for causing said first switching means to disconnect its input and output, for causing said second switching means to disconnect its input and output, and for connecting said microphone to said fourth terminal in response to the operation of said microphone.

2. The intercom apparatus of claim 1, and further comprising means connected to one of said control circuit inputs and responsive to a manual operation for causing said first switching means to connect its input and output and for causing said second switching means to disconnect its input and output, and thereby enable an operator to monitor signals received by said receiver.

* * * * *

UNITED STATES PATENT OFFICE

CERTIFICATE OF CORRECTION

PATENT NO. : 3,896,379

DATED : July 22, 1975

INVENTOR(S) : Robert A. Voss and Larry H. Wohlford

It is certified that error appears in the above-identified patent and that said Letters Patent are hereby corrected as shown below:

| | |
|---|---|
| Column 1, line 27 | cancel "simplified" and insert -- amplified -- |
| Column 2, line 25 | cancel " EMBODIMENT BACKGROUND" and insert -- EMBODIMENT -- |
| line 26 | insert -- BACKGROUND -- |
| line 27 | continue text starting with "FIG. 1 shows a block diagram etc..." |

Signed and Sealed this

*second* Day of *December 1975*

[SEAL]

*Attest:*

RUTH C. MASON
*Attesting Officer*

C. MARSHALL DANN
*Commissioner of Patents and Trademarks*